United States Patent
Choudhuri et al.

(10) Patent No.: US 10,496,498 B1
(45) Date of Patent: Dec. 3, 2019

(54) SYSTEMS AND METHODS FOR RAPID RECOVERY FROM FAILURE IN DISTRIBUTED SYSTEMS BASED ON ZONING PAIRS

(71) Applicant: Levyx, Inc., Irvine, CA (US)

(72) Inventors: Siddharth Choudhuri, Irvine, CA (US); Steffen Peter, Pasadena, CA (US)

(73) Assignee: Levyx, Inc., Irvine, CA (US)

( * ) Notice: Subject to any disclaimer, the term of this patent is extended or adjusted under 35 U.S.C. 154(b) by 308 days.

(21) Appl. No.: 15/475,330

(22) Filed: Mar. 31, 2017

(51) Int. Cl.
*G06F 11/14* (2006.01)

(52) U.S. Cl.
CPC ...... *G06F 11/1469* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,051,361 B2 | 11/2011 | Sim-Tang et al. | |
| 8,112,423 B2 | 2/2012 | Bernhard et al. | |
| 8,417,991 B2 | 4/2013 | Venkataraja et al. | |
| 9,053,167 B1 * | 6/2015 | Swift | G06F 16/27 |
| 9,378,059 B2 | 6/2016 | Huetter et al. | |
| 2009/0132716 A1 | 5/2009 | Junqueira et al. | |
| 2013/0262390 A1 * | 10/2013 | Kumarasamy | H04L 41/0846 707/649 |
| 2014/0006357 A1 * | 1/2014 | Davis | G06F 11/1464 707/667 |
| 2017/0005863 A1 * | 1/2017 | Falco | H04L 67/02 |
| 2017/0193003 A1 * | 7/2017 | Vijayan | G06F 16/27 |

* cited by examiner

*Primary Examiner* — Wilson Lee
(74) *Attorney, Agent, or Firm* — Fish IP Law, LLP

(57) ABSTRACT

A system for providing high availability to persistent data is provided that persists data on a node in discrete partitions that are each backed up on separate backup systems. When the system detects that the data saved on the node is compromised, the system could restore the data from multiple backup systems. Since the backup systems hold discrete sets of data that do not overlap one another, the backup systems are able to simultaneously and locklessly restore data to the compromised node.

12 Claims, 5 Drawing Sheets

|  | S0 | S1 | S2 | S3 |
| --- | --- | --- | --- | --- |
| R0 | $S1_1'$ | $S2_1'$ | $S3_1'$ | $S0_1'$ |
| R1 | $S2_2'$ | $S3_2'$ | $S0_2'$ | $S1_2'$ |
| R2 | $S3_3'$ | $S0_3'$ | $S1_2'$ | $S2_3'$ |
| R3 | $S0_1''$ | $S1_1''$ | $S2_1''$ | $S3_1''$ |
| R4 | $S1_2''$ | $S2_2''$ | $S3_2''$ | $S0_2''$ |

|  | S0 | S1 | S2 | S3 |
| --- | --- | --- | --- | --- |
| R0 | $S1_1'$ | $S2_1'$ | $S3_1'$ | $S0_1'$ |
| R1 | $S2_2'$ | $S3_2'$ | $S0_2'$ | $S1_2'$ |
| DELETED |  |  |  |  |
| R3 | $S0_1''$ | $S1_1''$ | $S2_1''$ | $S3_1''$ |
| R4 | $S3_3'$ | $S0_3'$ | $S1_2'$ | $S2_3'$ |

| | S0 | S1 | S2 | S3 | |
|---|---|---|---|---|---|
| R0 | $S1'_1$ | $S2'_1$ | $S3'_1$ | $S0'_1$ | |
| R1 | $S2'_2$ | $S3'_2$ | $S0'_2$ | $S1'_2$ | |
| R4 | $S3'_3$ | $S0'_3$ | $S1'_2$ | $S2'_3$ | |
| R3 | $S0''_1$ | $S1''_1$ | $S2''_1$ | $S3''_1$ | |
| | | | | | |

SYSTEMS AND METHODS FOR RAPID RECOVERY FROM FAILURE IN DISTRIBUTED SYSTEMS BASED ON ZONING PAIRS

FIELD OF THE INVENTION

The field of the invention is storage system devices.

BACKGROUND

The following description includes information that may be useful in understanding the present invention. It is not an admission that any of the information provided herein is prior art or relevant to the presently claimed invention, or that any publication specifically or implicitly referenced is prior art.

Ensuring that clients of storage systems always have access to their data is increasingly important when providing robust, real-time access to big data. Limited data access of hours, minutes, or even seconds can cost a company thousands of dollars in lost productivity or profit. As such, many different systems with fault tolerant infrastructures have been developed to provide as little down-time as possible.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

U.S. Pat. No. 8,051,361 to Sim-Tang et al. teaches a lock free clustered erasure coding solution whose processors negotiate with one another to decide the data sets for which each of them is responsible. So long as each data set is managed by only one erasure encoding processor, there is no need for locking the data, allowing the data to always be accessible at any time. While performing consistency checks, Sim-Tang's recovery process fixes inconsistent data sets in a lock-less manner before starting regular cluster activities. Sim-Tang's system, however, fails to persist data across a plurality of systems when a full system fails.

U.S. Pat. No. 8,112,423 to Bernhard discloses a system that replicates data from primary clusters to a replicated cluster. When a primary cluster fails, clients of the primary cluster are directed to the replicated cluster for service, and the replicated cluster is then used to restore data to the primary cluster. While Bernhard's system provides data persistence, data recovery is slowed by Bernhard's infrastructure of providing a single replicated cluster for each primary cluster.

Thus, there is still a need for a persistent system that allows for high availability and fast recovery of data.

SUMMARY OF THE INVENTION

The inventive subject matter provides apparatus, systems and methods in which a distributed computer storage system maintains data among a plurality of storage devices. The system partitions a set of primary data on a primary storage device, and persists each partition on a separate backup storage device, which allows data to be locklessly restored to the primary storage device when the system detects that any portion of the set of primary data is compromised. While the primary storage device is compromised, the system redirects requests for parts of the set of primary data to the backup storage devices that correlate with the part of the set of primary data. When the primary storage device is restored, the system can then direct request for parts of the set of primary data back to the primary storage device. Designations of primary storage devices and backup storage devices are specific to a set of primary data, so a backup storage device for a first set of primary data could be a primary storage device for a second set of primary data.

To ensure that data can be locklessly restored to a compromised primary storage device, the system is configured to partition the set of primary data such that no partition overlaps any other partition. Any suitable algorithm could be used to ensure that partitions remain discrete from one another, for example where there are only two backup storage devices, the first backup storage device could be allocated odd dataset keys while the second backup storage device could be allocated even dataset keys. Where there are three or more backup storage devices, hash keys and tables, or other algorithms could be utilized to substantially evenly the set of primary data by the number of backup storage devices. Storage devices that persist data between a set of partitioned primary data and a backup partition are designated zoning pairs that do not overlap one another, and can have data backed up and restored locklessly and independently from one another.

In some embodiments, the system could persist a single partitioned set of primary data to multiple backup storage devices, which allows data to be restored to the primary storage device even if one or more of the backup storage devices is unavailable. In other words, a single partitioned set of primary data could be a member of a plurality of zoning pairs. In some embodiments, the system could be configured to analyze each zoning pair for a single set of corrupted primary data and select the most available backup storage device for supplying the source data to restore from.

While the system restores data from a backup partition to a primary partition, the system could store redirected write requests as incremental writes from the time the compromise of the primary partition is detected. In this manner, after the primary partition has been restored from a backup, the system could then apply the incremental writes to the restored primary partition to ensure that, from the user's perspective, restoration of the primary partition is as transparent as possible.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 3A-3E shows a plurality of logical matrices that could be used to divide persistent data into discrete domains.

DETAILED DESCRIPTION

Figure 1:
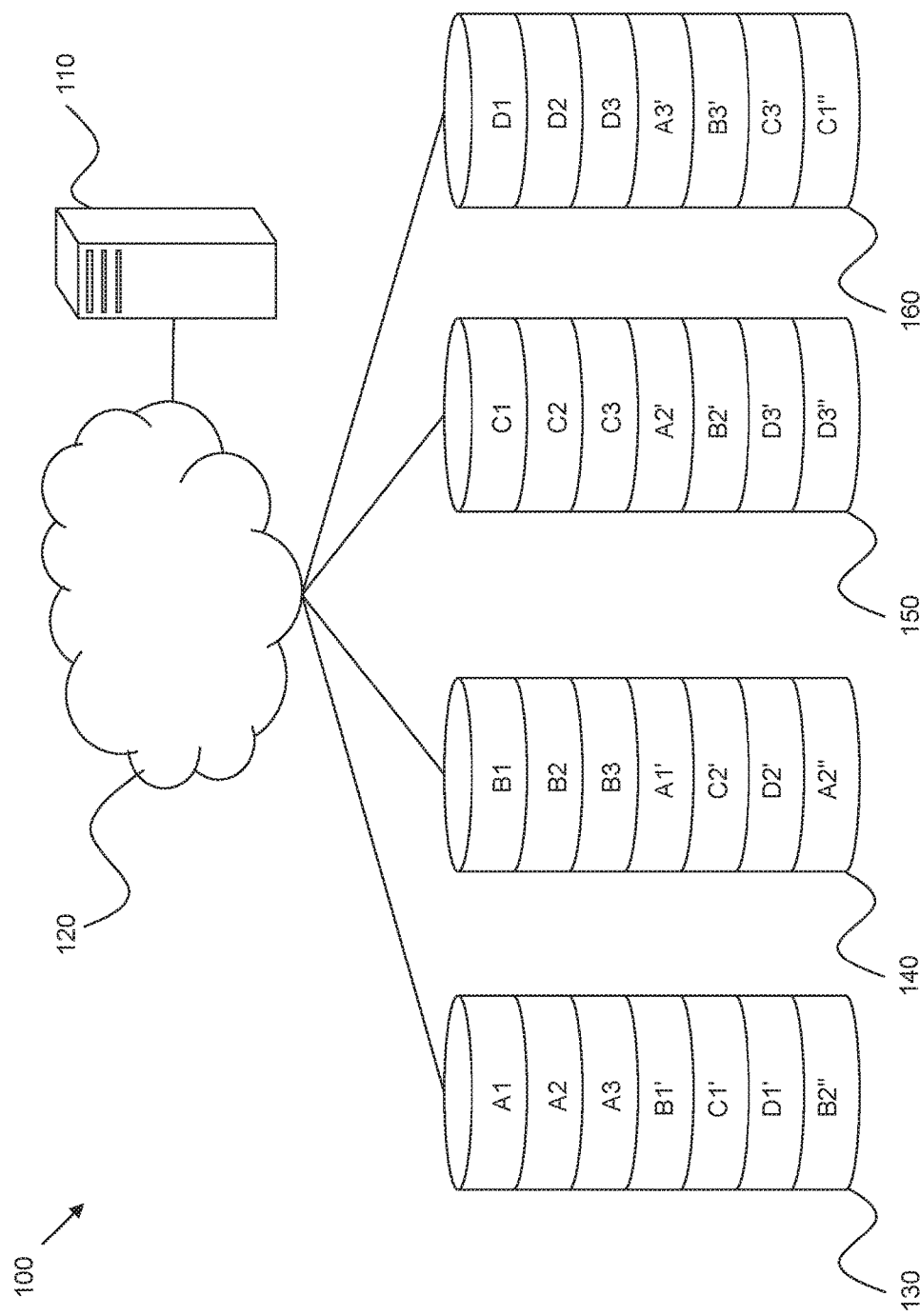
FIG. 1 shows a hardware schematic of a persistent data management system.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Computer system devices that are "functionally coupled to" one another are coupled via an electronic pathway that allows electronic data to be transmitted between the computer system devices using any suitable wired or wireless connection, with any number of intermediary systems.

It should be noted that any language directed to a computer system should be read to include any suitable combination of computing devices, including servers, interfaces, systems, databases, agents, peers, engines, controllers, storage systems, or other types of computing devices operating individually or collectively. Computer systems may have full operating systems capable of executing complex processing tasks, or may be bare bones systems whose only function is to store, receive, and transmit data to memory storage units. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on Fiber-Channel, PCIe Interface, NVMe, NVMe over Fabric, TCP, UDP, IP, HTTP, HTTPS, AES, public-private key exchanges, web service APIs, known financial transaction protocols, or other electronic information exchanging methods, including proprietary communication interfaces. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

As used herein, data that "persists" on one or more other computer systems is data that is duplicated. Such data could be duplicated in whole, or could be striped in some manner. Data could be compressed prior to duplication.

The inventive subject matter provides apparatus, systems and methods in which a distributed computer storage system maintains data among a plurality of storage devices.

FIG. 1 shows an exemplary distributed computer storage system 100 having a computer system 110 functionally coupled to storage devices 130, 140, 150, and 160 via network 120.

Computer system 110 is shown euphemistically as a separate computer server ostensibly having a processor with transient and non-transient memory, but could be any suitable computer system programmed to maintain data persistence among a plurality of storage devices, such as a plurality of computer servers or a cloud computer system, or could be implemented as a part of one of storage devices 130, 140, 150, or 160. Computer system 110 manages data between storage devices 130, 140, 150, and 160 and monitors the storage devices to, among other things, ensure that primary data persists among the storage devices, monitor primary data and detect when a set of primary data becomes compromised, redirect requests to correlating backup partitions when a set of primary data becomes compromised, locklessly restore a set of primary data from backup partitions when a set of primary data becomes compromised, redirect requests back to the primary data when the set of primary data is restored, add storage devices to the data maintenance system, and remove storage devices from the data maintenance system.

Network 120 could be any hub that is used to communicate data from one computer system to another computer system, such as a packet-switched network, the Internet, LAN, WAN, VPN, or other suitable data hub. The network infrastructure is such that an application on application computer system 110 is able to freely access memory on any of the computer systems made available to the DSCM system. Preferably the network infrastructure comprises high-speed hardware systems, such as fibre or gigabit Ethernet hardware systems, such that the delay in accessing volatile memory on other computer systems is optimized, and is comparable to a local system bus.

Storage systems 130, 140, 150, and 160 are shown euphemistically as discrete storage systems that only stores data, such as a NAS or other storage devices, but could be any suitable device capable of storing and transmitting data, such as computer system nodes or cloud storage devices. Each storage system has a set of preferably a non-transient computer-readable medium that stores data, although since the data on each storage system persists on a plurality of other storage systems, in some embodiments the data could be stored on transient computer-readable medium. In embodiments where the storage systems save primary data on only non-transient computer-readable medium, the primary data stored on combined storage systems 130, 140, 150, and 160 could be considered a non-transient computer-readable medium so long as more than 1 storage medium is not compromised simultaneously. In systems with 2, 3, or more levels of redundancy on storage mediums that only save data on transient computer-readable medium, the collective storage systems could be considered non-transient computer-readable medium for all intents and purposes.

Storage system 130 has a set of primary data A, which administrative computer system 110 has splits into three partitions—A1, A2, and A3—which each persist on other storage systems. Primary partition A1 has been zoned with backup partition A1' on storage system 140. Primary partition A2 has been zoned with backup partition A2' on storage system 150 and with backup partition A2" on storage system 140. Primary partition A3 has been zoned with backup partition A3' on storage system 160. Note that primary partition A2 is part of two zoning pairs—A2' and A2". This allows either storage system 150 or storage system 140 to be used to restore data to primary partition A2, if administrative computer system 110 detects that any data stored in primary partition A2 has been compromised. In some embodiments, administrative computer system 110 will restore all of a primary partition if it detects that any data on primary partition has been compromised. In preferred embodiments, administrative system 110 will check only portions of each partition, and will only restore those compromised portions, to minimize downtime.

Storage devices 140, 150, and 160 are set up similarly with regards to set of primary data B (split into partitions B1, B2, and B3), set of primary data C (split into partitions C1, C2, and C3), and set of primary data D (split into partitions D1, D2, and D3). While each set of primary data has only been split into 3 partitions here, more or less partitions could be used. While each partition is assigned to only 1-2 zoning pairs, in some embodiments more zoning pairs could be assigned to each partition.

Zoning pairs could be assigned in any suitable manner. For example, a database key could be used to partition database data into a set of k backup partitions, where each backup partition is numbered from $R_0$ to $R_{k-1}$. In such an embodiment, the system could allocate a backup partition to each database key by modding each database key against k. Thus, where k=20, database key 36 would be allocated to $R_{16}$ since mod (36, 20)=16 and database key 241 would be allocated to $R_1$ since mod (241,20)=1. Hash tables or other algorithms that substantially evenly divide a set of data could be used as well.

Administrative computer system 110 could detect that primary data is compromised in any suitable manner. For example, administrative computer system 110 could periodically execute checksum processes on all or part of a primary data partition, or could receive a warning from a monitoring computer system, or could ping a storage device and could determine that a storage device has gone offline. In situations where a storage device goes offline, such as storage device 130, the administrator computer system could seek to restart storage device 130 and save incremental writes to corresponding backup partitions in storage device 140, 150, and 160. When administrative computer system 110 detects that storage device 130 has come back online, the administrative computer system 110 could locklessly restore the set of primary data A from the backup partitions A1', A2', and A3', including the incremental writes.

In situations where the administrative computer system 110 may be unable to restart storage device 130, a new storage device 130 could be easily recreated by locklessly writing data from backup partitions A1', A2', and A3' to a virgin storage system.

Figure 2:
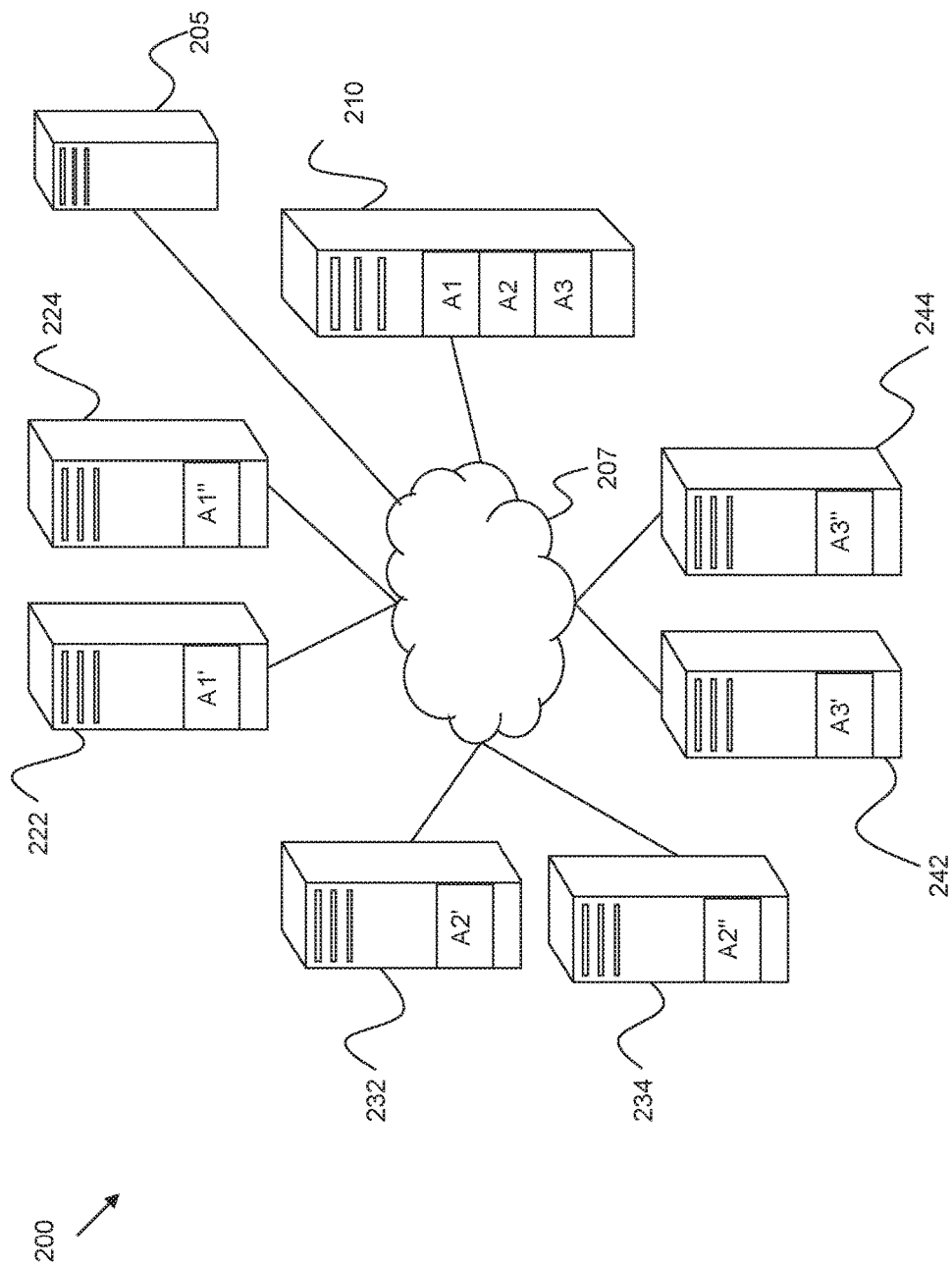
FIG. 2 shows an alternative hardware schematic of a persistent data management system.

FIG. 2 shows an alternative distributed computer storage system 200 having a central computer system 205 functionally coupled to primary storage device 210 and a plurality of backup storage devices 222, 224, 232, 234, 242, and 244. Each of the computer systems are functionally coupled to one another via network 207, similar to network 120 in FIG. 1. Each storage device 210, 222, 224, 232, 234, 242, and 244 are shown here euphemistically as discrete desktop computer systems, but could be any storage device suitable for storing and transmitting data. Here, storage device 210 has a set of primary data A, partitioned into A1, A2, and A3. Primary partition A1 is zoned with backup partition A1' on storage device 222 and with backup partition A1' on storage device 224. Primary partition A2 is zoned with backup partition A2' and backup partition A2". Primary partition A3 is zoned with backup partition A3' and backup partition A3".

In system 100, the storage devices were used in a dual role—both as primary storage devices and as backup storage devices. Here, the storage devices are designated as either primary storage devices or as backup storage devices—not as both. Utilizing storage devices that are dedicated towards primary use or backup use greatly simplifies the setup and maintenance process, however underutilizes storage devices that may be put to better use as primary storage devices, since backup storage devices are only used when data in a primary partition has been compromised. In preferred embodiments, the managing computer system could logically partition storage devices to have some sections of memory allocated towards primary storage and backup storage to maximize utilization at all times.

FIGS. 3A-3E show a plurality of logical matrices used to divide persistent data into discrete domains. It is preferred to divide each set of primary data into a discrete partition to ensure lock-less recovery if an entire set of primary data goes down, which is often the case when an entire server goes offline. Here, primary storage systems S0, S1, S2, and S3 are persisted on backup storage systems R0, R1, and R2. The management system preferably incorporates these storage systems into a matrix, such as the matrix shown in FIG. 3A, and draws diagonal lines to separate these four storage systems into four separate domains—domain D0, domain D1, domain D2, and domain D3. By separating the domains in this manner, primary storage systems could be easily allocated towards backup storage systems.

Figure 3A:
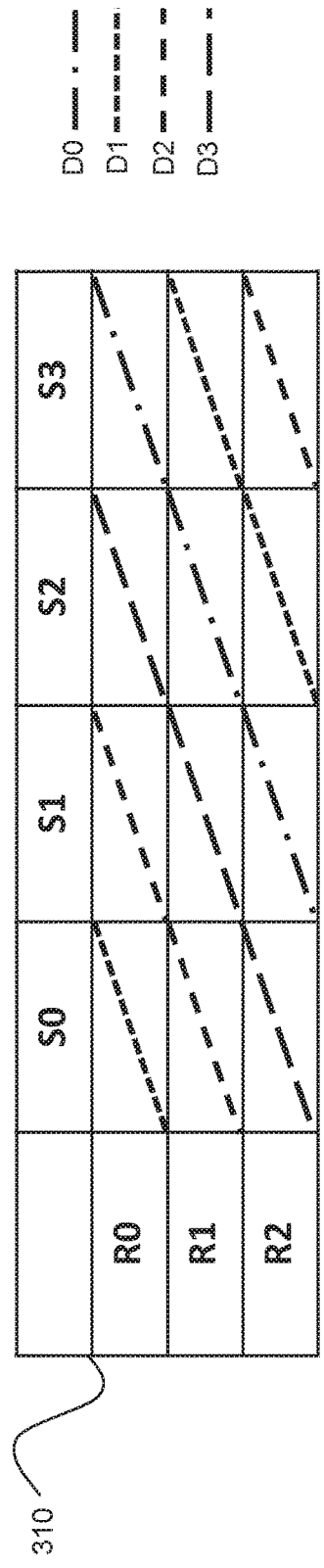
Figure 3B:
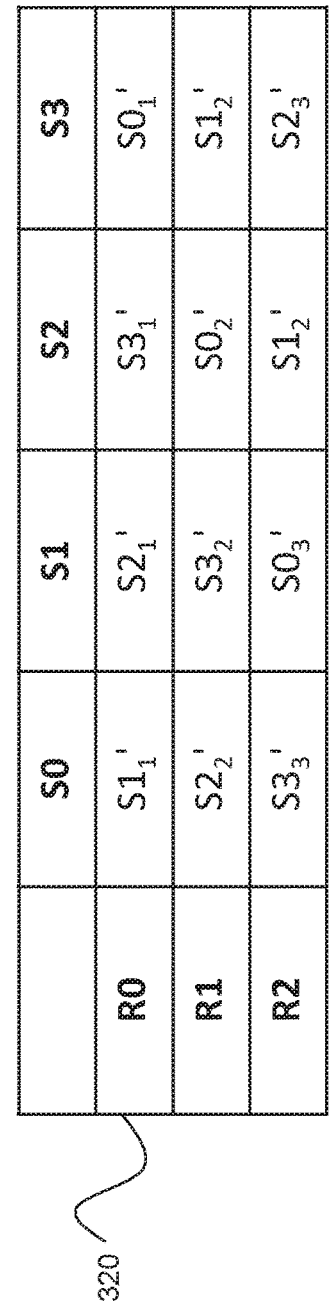

Each primary storage system is separated into three partitions—$SX_1$, $SX_2$, and $SX_3$—where X represents the number of the storage system. The backup partitions are then allocated towards each domain as shown in FIG. 3B. Domain D0 is allocated towards primary storage system S0, domain D1 is allocated towards primary storage system S1, domain D2 is allocated towards primary storage system S2, and domain D3 is allocated towards primary storage system S3. Backup storage system R0 then holds four backup storage partitions—partition $S1_1'$, $S2_1'$, $S3_1'$, and $S0_T'$. Backup storage system R2 holds four backup storage partitions—partition $S2_2'$, $S3_2'$, $S0_2'$, and $S1_2'$. Backup storage system R0 then holds four backup storage partitions partition $S3_3'$, $S0_3'$, $S1_2'$, and $S2_3'$. Set up in this manner, should any of the primary storage systems fail or become compromised in some other manner, the backup storage systems could restore data to the primary storage system locklessly.

Using the matrix system, a minimum of k−1 backup storage systems need to be provided for every k primary storage systems in order to ensure lockless recovery. Additional backup storage systems could be added to provide for additional stability. For example in FIG. 3C, backup storage systems R3 and R4 have been added to provide for additional persistence for at least some of the primary storage partitions. The same lines from FIG. 3A have been extended downwards to ensure that each domain remains separate from one another so that discrete recovery is preserved and the same backup system would not be used to provide recovery to two separate partitions of the same primary storage device.

When backup storage systems are removed, the administrative computer system may need to migrate data from one backup system to another before a backup storage system is removed. For example, in FIG. 3D, backup system R2 has been removed. However, the backup data from R2 is not duplicated on any of the other backup systems. So the backup data from R2 has been copied to R4 before R2 was deleted—which allows R2 to be deleted safely while still preserving data persistence. In order to preserve the matrix with discrete domains, the logical partition organization for R4 is moved up to spot #3 in FIG. 3E.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method for maintaining data among a plurality of storage devices, comprising:
    designating a first set of primary data on a first storage device as a first persistent set of primary data;
    persisting a first primary partition of the first persistent set of primary data to a first backup partition on a second storage device;
    persisting a second primary partition of the first persistent set of primary data to a second backup partition on a third storage device, wherein the first primary partition does not overlap the second primary partition;
    detecting a compromise of the first set of primary data;
    redirecting requests for a portion of the first set of primary data to at least one of the first backup partition and the second backup partition;
    locklessly restoring the first primary partition from the first backup partition; locklessly restoring the second primary partition from the second backup partition; and
    zoning the first primary partition to the first backup partition as a first zoning pair, and the second primary partition to the second backup partition as a second zoning pair.

2. The method of claim 1, further comprising defining the first primary partition as odd dataset keys of the first set of primary data and the second primary partition as even dataset keys of the first set of primary data.

3. The method of claim 1, further comprising:
    designating a second set of primary data on the second storage device as a second persistent set of primary data;
    persisting a third primary partition of the second persistent set of primary data to a third backup partition on the first storage device;
    persisting a fourth primary partition of the second persistent set of primary data to a fourth backup partition on the third storage device, wherein the third primary partition does not overlap the fourth primary partition;
    detecting a compromise of the second set of primary data;
    redirecting requests for a portion of the second set of primary data to at least one of the third backup partition and the fourth backup partition;
    locklessly restoring the third primary partition from the third backup partition; and
    locklessly restoring the fourth primary partition from the fourth backup partition.

4. The method of claim 1, further comprising redirecting requests for a portion of the first set of primary data back to the first set of primary data when the steps of locklessly restoring the first primary partition and locklessly restoring the second primary partition are complete.

5. The method of claim 1, further comprising designating the second storage device and the third storage device as a function of a domain matrix that splits the first primary partition and the second primary partition into disjointed data sets.

6. The method of claim 1, further comprising:
    persisting a third primary partition of the first persistent set of primary data to a third backup partition on a fourth storage device,
        wherein the first primary partition, the second primary partition, and the third primary partition all comprise disjointed data of the first persistent set of primary data from one another, and
        wherein the step of redirecting requests further comprises redirecting at least some of the requests to the third backup partition; and
    locklessly restoring the third primary partition from the third backup partition.

7. The method of claim 1, further comprising:
    persisting the first primary partition of the first persistent set of primary data to a third backup partition on a fourth storage device; and
    persisting the second primary partition of the first persistent set of primary data to a fourth backup partition on a fifth storage device, wherein the step of redirecting requests further comprises redirecting at least some of the requests to the fourth backup partition, wherein the step of redirecting requests further comprises redirecting at least some of the requests to the fifth backup partition.

8. A computer-implemented method for maintaining data among a plurality of storage devices, comprising:

designating a first set of primary data on a first storage device as a first persistent set of primary data;

persisting a first primary partition of the first persistent set of primary data to a first backup partition on a second storage device;

persisting a second primary partition of the first persistent set of primary data to a second backup partition on a third storage device, wherein the first primary partition does not overlap the second primary partition;

persisting the first primary partition of the first persistent set of primary data to a third backup partition on a fourth storage device; and persisting the second primary partition of the first persistent set of primary data to a fourth backup partition on a fifth storage device;

detecting a compromise of the first set of primary data;

redirecting read requests for a portion of the first set of primary data to at least one of the first backup partition and the second backup partition;

locklessly restoring the first primary partition from the third backup partition; locklessly restoring the second primary partition from the fourth backup partition; and zoning the first primary partition to the first backup partition as a first zoning pair, and the second primary partition to the second backup partition as a second zoning pair.

9. The method of claim 8, further comprising redirecting write requests for a portion of the first set of primary data to at least one of the first backup partition and the second backup partition.

10. The method of claim 9, further comprising recording the redirected write requests as incremental writes from the time the compromise of the first set of primary data is detected.

11. The method of claim 10, further comprising implementing the incremental writes to the first set of primary data when the steps of locklessly restoring the first primary partition and locklessly restoring the second primary partition are complete.

12. The method of claim 11, further comprising redirecting requests for a portion of the first set of primary data back to the first set of primary data when the step of implementing the incremental writes to the first set of primary data is complete.

* * * * *